United States Patent [19]

Herman et al.

[11] Patent Number: 4,705,199

[45] Date of Patent: Nov. 10, 1987

[54] VACUUM DRUM FOR SECURING A FILM THERETO

[75] Inventors: John L. Herman, Huber Heights; Robert A. Dessert; Dinesh G. Punater, both of Dayton, all of Ohio

[73] Assignee: Harris Graphics Corporation, Melbourne, Fla.

[21] Appl. No.: 750,814

[22] Filed: Jun. 28, 1985

[51] Int. Cl.$^4$ ............................................ B65H 20/12
[52] U.S. Cl. ....................................................... 226/95
[58] Field of Search ...................... 226/93, 95; 242/74, 242/182; 101/382 MV

[56] References Cited

U.S. PATENT DOCUMENTS

| | | |
|---|---|---|
| 2,753,181 | 7/1956 | Anader . |
| 2,837,330 | 6/1958 | Lawrance et al. . |
| 2,908,495 | 10/1957 | Andrews et al. ...................... 226/95 |
| 3,078,796 | 2/1963 | Kamata et al. . |
| 3,112,698 | 12/1963 | Lake . |
| 3,122,295 | 2/1964 | Davidson et al. ................. 226/95 X |
| 3,125,265 | 3/1964 | Warren et al. . |
| 3,380,381 | 4/1968 | Musgrave . |
| 3,463,476 | 8/1969 | De Maria et al. . |
| 3,521,538 | 7/1970 | Escoli . |
| 3,521,802 | 7/1970 | Bossons . |
| 3,630,424 | 12/1971 | Rau . |
| 3,677,643 | 7/1972 | Sagawa . |
| 4,005,653 | 2/1977 | Arkell . |
| 4,029,249 | 6/1977 | Nagel et al. ........................... 226/95 |
| 4,056,057 | 11/1977 | Smith . |
| 4,101,018 | 7/1978 | Sokolowski ............ 101/382 MV X |
| 4,207,998 | 6/1980 | Schmid . |
| 4,277,010 | 7/1981 | Landskroener et al. . |
| 4,504,843 | 3/1985 | Pröhl et al. ........................ 226/95 X |

FOREIGN PATENT DOCUMENTS 4401695 7/1973 United Kingdom .

Primary Examiner—Stuart S. Levy
Assistant Examiner—Lynn M. Sohacki
Attorney, Agent, or Firm—Biebel, French & Nauman

[57] ABSTRACT

A rotatable drum is disclosed for securing thereto various sizes of sheets of film by a partial vacuum. The drum includes a cylindrical body and first and second circular end blocks connected for closing the body. The drum is mounted for rotation about its central axis. The first end block defines concentrically therethrough a central passageway, connected to a source of partial vacuum so that the drum may be partially evacuated. The cylindrical body defines on its outer surface a plurality of parallel, identical grooves extending circumferentially about the body. A plurality of holes also extend through the body, each of the holes opening on the outer surface into one of the grooves. Importantly, the cross-sectional area of each hole is approximately equal to the cross-sectional area of each of the grooves, and no porting or valving is provided for the drum interior to close unneeded holes. The first block further defines a plurality of auxiliary passageways, each of the auxiliary passageways opening at a first end through the inner face of the block and connecting at a second end with the central passageway. The auxiliary passageways are disposed within the first block symmetrically about the axis of the drum.

13 Claims, 6 Drawing Figures

VACUUM DRUM FOR SECURING A FILM THERETO

BACKGROUND OF THE INVENTION

The present invention relates generally to a cylindrical drum for securing thereto a sheet of film by a partial vacuum or suction. More specifically, the invention to relates to a drum which is adapted to hold film sheets of different sizes for exposure by a controlled light beam during rotation of the drum.

It has been known to prepare plates for printing presses using a photographic technique in which an unexposed film has recorded thereon the desired pattern to be printed. More recently, and for example in the case of printed business forms, computer equipment has been used for composition of the pattern to be printed. Information relating to the desired pattern is edited and then stored within the computer, and finally is used to control exposure of the film for the making of the printing plate.

One component of such a system is the mechanism for exposing the film and, associated therewith, an apparatus for securing the film during exposure. In one known system, the film is exposed using the fine beam produced by a laser. Positioning of the light dot produced on the film by the laser is achieved by securing the film to a rotating drum and directing the beam onto the drum. The dot is moved back and forth along the length of the drum using a movable prism or mirror. Rotational and linear positions of the dot on the drum are monitored and synchronized with blocking and unblocking of the laser to produce the desired image.

It is critical to successful operation of such a system that the film be accurately positioned and securely held on the drum. Otherwise, the laser beam will not be directed to the proper location.

In one present system of this type, a vacuum drum is provided with holes extending through the drum surface near the ends of the drum. A high vacuum pump is connected to the drum to remove air from its interior. The film is placed over the drum, although not over any of the holes and the transparent cover sheet is placed over the film. (A few holes may be provided beneath the film to remove any trapped air.) The cover sheet is tightly secured along its side edges by the vacuum, and the cover sheet in turn secures the film to the drum. It is important that the film be tightly held, as rotational speeds of as much as 2000 rpm are common for equipment of this type. Since this system relies upon a high vacuum with a low volume of air removed, even a very slight leak can result in the film being released from the drum.

Such a system is advantageous in that it enables the drum to secure film sheets of various sizes. This is important, since plates of differing size must be produced. Because the cover sheet is of the same dimensions regardless of the film being secured, all vacuum holes formed in the drum will be covered in every case. Consequently, a very simple drum structure may be used.

However, several problems are presented by the use of a cover sheet to hold the film on the drum. As can be readily appreciated, positioning of the film beneath the cover sheet can be a difficult operation. Moreover, the cover sheet must be fitted to the drum without any wrinkling, as this will affect the optical properties of the cover sheet through which the laser beam must pass to expose the film. Further, the cover sheet is susceptible, particularly during periods of low air humidity, to the build-up of a static charge along the sheet. This in turn attracts dust, which degrades the quality of the image placed on the film. Further, as the cover sheet is removed, the static may be discharged at the separation point between the sheet and the film. Any sparks generated as a result will expose the film.

In addition, the cover sheet may tend to stretch as a result of repeated installation and removal on the drum, thereby requiring periodic trimming or frequent replacement. Further, the sheet must be formed from a material that does not exhibit any significant decrease in transparency over time, and any such change must be uniform throughout the sheet.

It would therefore be of great advantage to design a vacuum drum for securing a film that does not require a cover sheet. To do this, a drum must be provided that is not affected by certain of the vacuum holes in the drum being uncovered, as this will occur whenever a film sheet is used that is of a size smaller than the outer surface of the drum. However, uncovered vacuum holes will tend to lower the vacuum that is produced in the drum interior. Consequently, a number of drums have been designed that rely upon various porting or valving devices to close unused holes. See for example U.S. Pat. No. 4,005,653 to Arkell and U.S. Pat. No. 2,753,181 to Anander.

It has been disclosed in U.S. Pat. No. 3,630,424 to Rau that it is possible to construct a vacuum drum without internal porting or valving that will work in situations where less than the entire drum surface is covered. Rau describes a drum having its surface covered with a plurality of parallel, V-shaped grooves that are interconnected with larger grooves having holes formed therein for communication with the interior of the drum. The smaller grooves are closely spaced and are quite shallow. This drum is described by Rau as working well when used to isolate tension in a web moving around a portion of the drum surface.

What is needed, therefore, is a means for mounting the film for exposure that avoids the problems noted above. Specifically, a vacuum drum is needed that does not require internal porting or valving, but that performs with single sheets of film rotated at high speeds, even in cases where a number of the vacuum holes are left uncovered. Such a drum would enable much more convenient exposure of the film, while retaining the general advantages of a vacuum drum.

SUMMARY OF THE INVENTION

In meeting the needs set forth above, the present invention provides a rotatable drum for securing thereto a sheet of film by suction provided from a source of partial vacuum. It has been found that a drum that performs well can be produced based upon a low vacuum, high volume approach. Such a drum includes a cylindrical body that defines an inner and an outer surface and a central axis for the drum. First and second circular end blocks are connected to the cylindrical body for closing the body, with each of the end blocks defining an inner face disposed within the drum. The drum is further provided with means to mount it for rotation about the central axis.

The cylindrical body defines on its outer surface a plurality of parallel, identical small grooves extending circumferentially about the body. A plurality of small holes also extend through the body, each of the holes opening on the outer surface into one of the grooves. Importantly, the cross-sectional area of each hole is approximately equal to but slightly larger than the cross-sectional area of each of the grooves.

The first end block defines concentrically therethrough a central passageway. The central passageway is connected to the source of partial vacuum, so that the drum may be partially evacuated. The first block further defines a plurality of auxiliary passageways, each of the auxiliary passageways opening at a first end through the inner face of the block and connecting at a second end with the central passageway. The auxiliary passageways are disposed within the first block symmetrically about the axis of the drum.

The auxiliary passageways preferably open through the inner face of the first end block adjacent the inner surface of the cylindrical body. Further, the first block defines six of the auxiliary passageways.

Defined along the outer surface of the cylindrical body is a strip extending across the width of the drum parallel to its axis. The grooves are formed into the drum surface such that no grooves extend across the strip, which as a result defines for each of the grooves a head end and a tail end. Further, a first one of the holes is defined through the body at the head end of each of the grooves.

Second ones of the holes may be defined through the drum body along a predetermined number of adjacent grooves at a distance from their head ends approximately equal to a predetermined standard dimension for a sheet of film. More specifically, the distance from the head ends is subtantially ⅛" (3.2 mm) less than the predetermiined standard dimension for the film sheet. Third ones of the holes are defined along a portion of the grooves between the first and second ones of the holes. The third ones of the holes may be defined in alternating ones of the grooves.

Accordingly, it is an object of the present invention to provide a means for securing a sheet of film to a rotatable vacuum drum without using a transparent cover sheet; to provide such a means in which various sizes of film may be accommodated; to provide such a means wherein the sheet is secured to the drum by a partial vacuum regardless of the presence of uncovered vacuum holes on the drum; to provide such a means in which the drum does not rely on internal porting or valving; and to provide such a means in which the film is easily and reliably installed and removed.

Other objects and advantage of the present invention will be apparent from the followng description, the accompanying drawings, and the appended claims.

DETAILED DESCRIPTION OF THE PREFERRED EMBODIMENT

Figure 1:
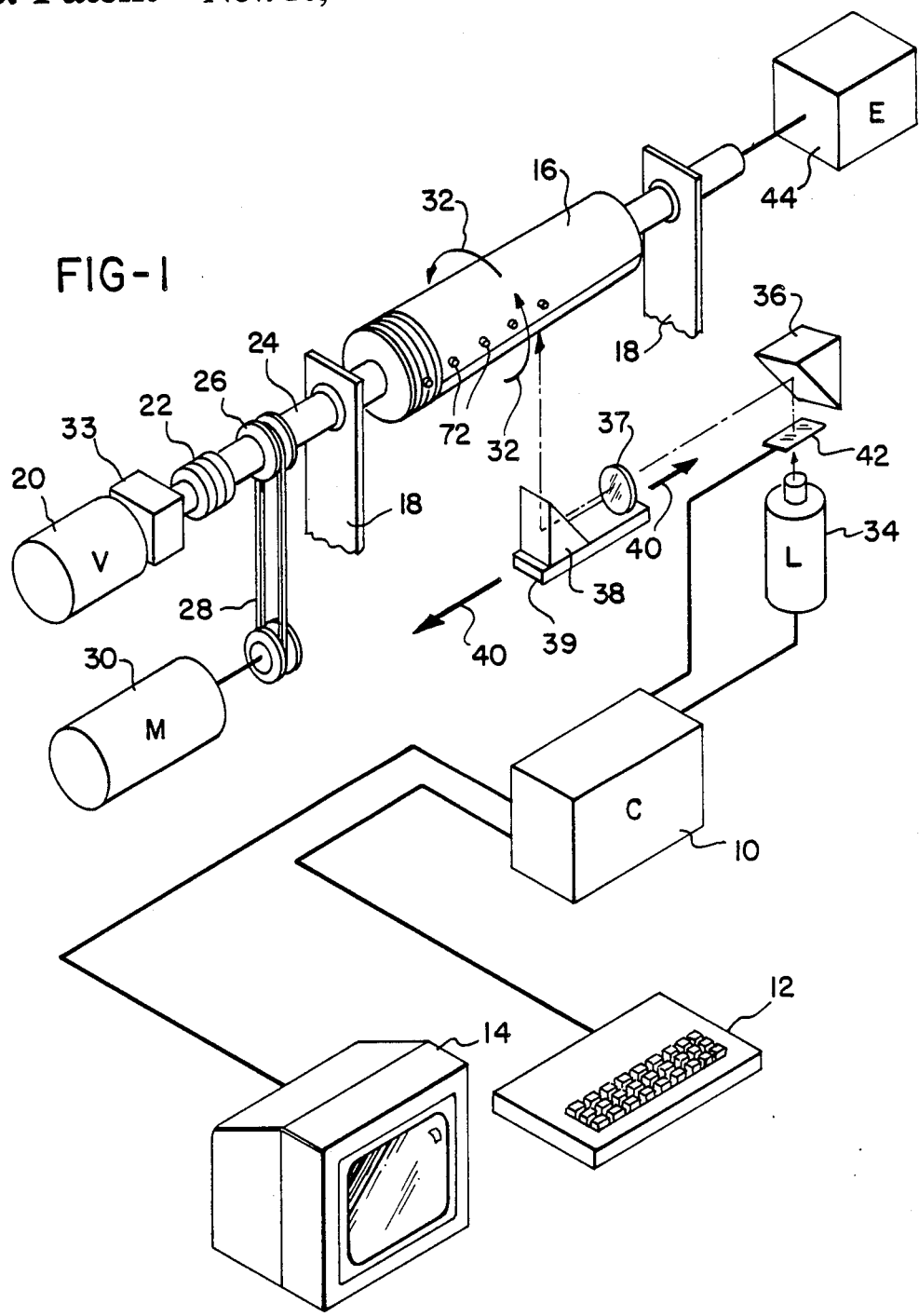
FIG. 1 is a partially schematic view illustrating a system for producing a film negative for a printing plate, incorporating a vacuum drum in accordance with the present invention.

Referring generally to FIG. 1, an apparatus for composing and producing a negative used in preparing a printing press plate is schematically shown. The apparatus incorporates a vacuum drum in accordance with the present invention.

The apparatus is controlled generally by a computer 10 to which a keyboard 12 and video display 14 are connected. An operator inputs information through keyboard 12 into computer 10 regarding the desired configuration for the image to be formed on the finished plate. A display of the image as it is composed and edited is presented on screen 14. After the image has been finalized, it is stored within computer 10.

When a negative to be later used in generating the printing plate is to be prepared, a sheet of film is secured, as will be described, to the surface of a vacuum drum 16. Drum 16 is mounted for rotation to a pair of supports 18, which may be of conventional design, including appropriate bearings (not shown). The film is secured to drum 16 by a partial vacuum supplied to the drum from vacuum pump 20. The vacuum is applied to the film through a plurality of holes formed in the drum surface, as will be described in detail below. Pump 20 is connected by various tubing to a rotary journal 22, which in turn connects with the interior of drum 16 through hollow shaft 24. A pulley 26 is disposed on shaft 24, around which is positioned a drive belt 28 connected to a motor 30. Thus, actuation of motor 30 causes rotation of drum 16 in the direction indicated by arrows 32.

A vacuum relief device 33 is provided between pump 20 and journal 22 to protect the pump mechanism in the event that all the vacuum holes in the drum surface are covered. This will be the case when the largest sheet of film the drum can accomodate is used. The device can be a commercially available mechanical or electromechanical device, and in the latter case, may be provided with computer control. Device 33, which may be physically mounted to the assembly of pump 20, operates such that a valve is opened to allow sufficient air flow through the pump to cool the pump when the drum is covered. When sufficient air is provided as a result of uncovered holes due to smaller film size, the device closes to maximize the vacuum within drum 16.

A laser 34 is provided for generating a well-defined beam of light used to expose the film carried on drum 16. The beam is directed from laser 34 to a stationary mirror or prism 36 that directs the beam in a direction parallel to the central axis of drum 16. The beam then passes through a focusing lens 37 and strikes a movable mirror 38 which is mounted on an appropriate carriage 39 for movement adjacent drum 16 in the direction indicated by arrows 40. After leaving mirror 38, the beam strikes the film carried on drum 16. Lens 37 is selected such that the beam is focused at the surface of drum 16 and is mounted to carraige 39 so that the distance from lens 37 to the drum surface is constant.

A beam modulator 42, which may be for example an electro-optical modulator, is located within the beam path for selectively blocking and permitting the beam to pass therethrough. As drum 16 is rotated, modulator 42 is controlled by computer 10, so that in conjunction with movement of mirror or prism 38, the beam selectively exposes portions of the entire film utilizing a raster type of approach. An encoder 44 is connected to drum 16 to provide for computer 10 an indication of the rotary position of drum 16. A linear scale (not shown) is examined by a measurement device on carriage 39 to control the axial motions of the beam. By means of feedback control loops using rotational and axial measurements, a computer is used to properly control the film exposure.

Upon completion of the necessary exposure of the film, the film is removed from drum 16 and taken for further processing.

It will be recognized that operation of drum 16 must take place in darkness to avoid unwanted exposure of the film. Accordingly, proper covering structures are provided for drum 16 and the surrounding mechanism, such structure having been eliminated for clarity.

Figure 2:
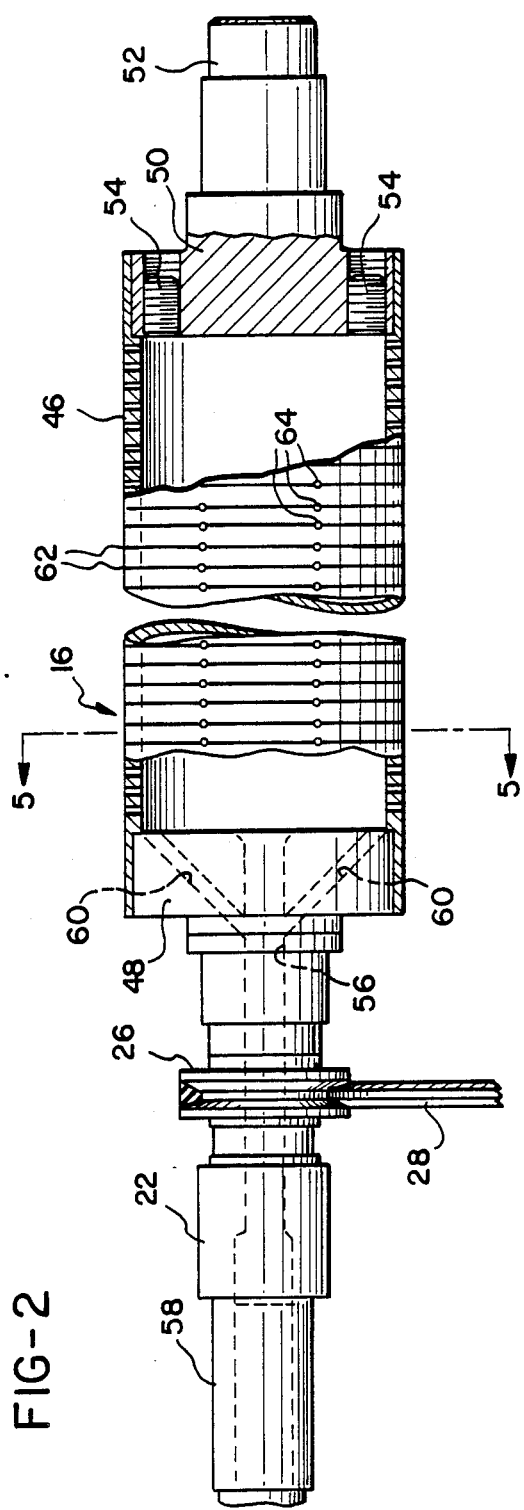
FIG. 2 is a plan view of the drum shown in FIG. 1, showing a portion of the drum surface broken away.

The detailed construction of drum 16 may be seen by reference to FIG. 2. A hollow cylindrical body 46 has fitted into each end circular blocks 48 and 50. Formed as part of block 50 is a shaft 52 which supports one end of drum 16 for rotation. A pair of plugs 54 are fittable within threaded holes extending through block 50, thereby providing a means for cleaning the interior of drum 16, either of metal particles as the drum is constructed, or of paper or other debris pulled into the drum during its operation.

Circular end block 48 includes a central passageway 56 connecting the interior of drum 16 with the vacuum source. Passageway 56 extends through shaft 24 to the rotary journal 22, where the passageway connects with a vacuum conduit 58 leading to the vacuum pump. End block 48 further has formed therein a plurality of auxiliary passageways 60 that connect central passageway 56 with the interior of drum 16. The purpose of auxiliary passageway 60 will be described in detail below.

Figure 3:
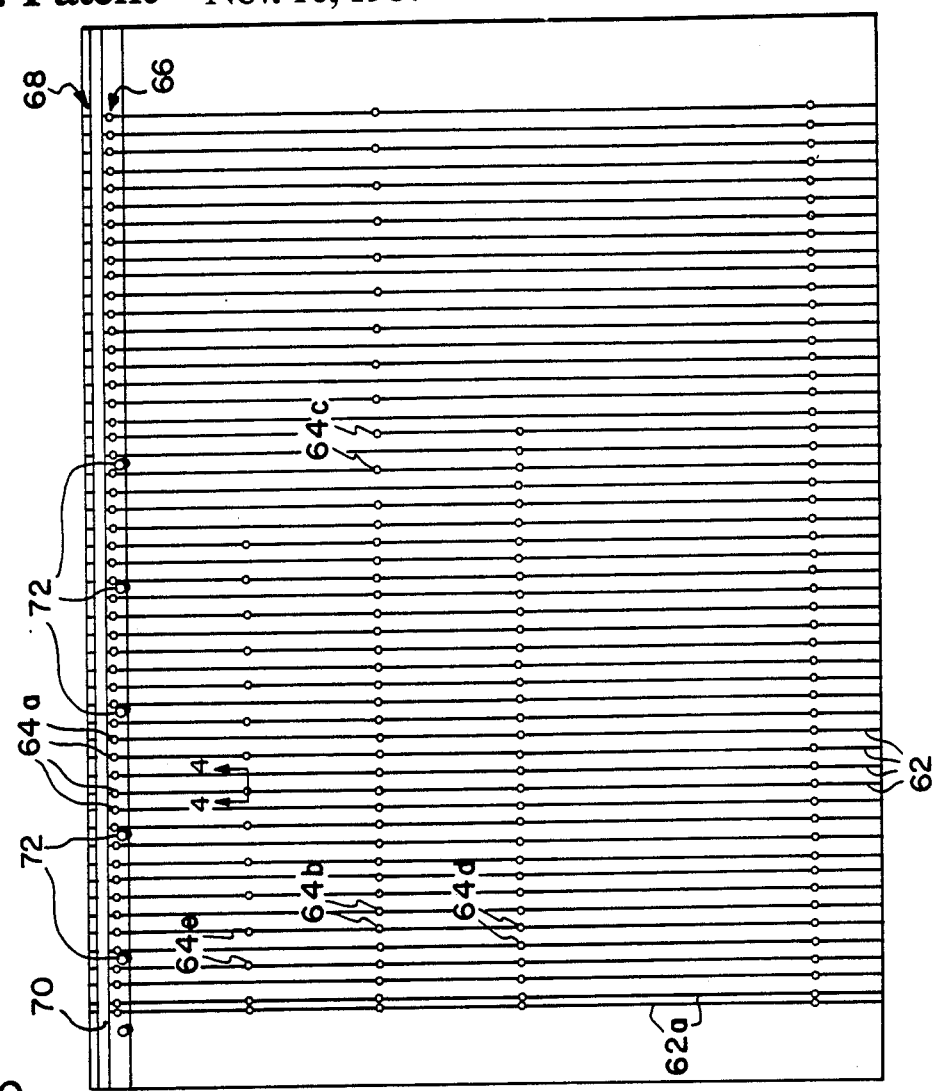
FIG. 3 is a projected view of the surface of the drum.

Formed into the outer surface of cylindrical body 46 is a plurality of parallel grooves 62, along with a plurality of holes 64 that extend through the body to the drum interior. A projected view of the surface of drum 16 is shown in FIG. 3, where the pattern of grooves 62 and holes 64 is more clearly presented. It will be recognized that the portions of the drum shown at the top and bottom of this figure are in fact connected without any discontinuity, thereby forming the cylindrical outer surface.

Figure 5:
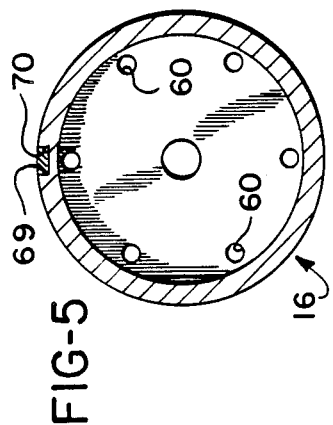
FIG. 5 is a sectional view taken generally along line 5—5 of FIG. 3.

Referring now to FIG. 3, it can be seen that each groove 62 extends from a head end shown generally at 66 to a tail end shown generally at 68. As seen in FIG. 5, a recess 69 is formed along the outer surface of the drum, extending its full length. Into recess 69 is secured a bar 70, defining both head end 66 and tail end 68 for each groove 62.

Bar 70 may be formed of metal and secured into recess 69 by welding, or may be formed from a resilient material to a slight oversize for force fitting within the recess. As an alternative, welding alone may be used to close grooves 62.

Each adjacent pair of grooves 62 is separated by a distance of ½" (1.27 cm), with the exception that the initial pair of grooves at the left-most side of drum 16 as seen in FIG. 3, designated as grooves 62a, are separated by only ¼" (0.63 cm).

Figure 4:
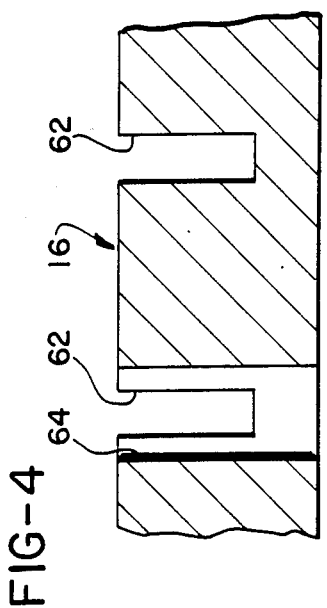
FIG. 4 is a sectional view taken generally along line 4—4 of FIG. 3.

Important dimensional relationships between grooves 62 and holes 64 may be seen by reference to FIG. 4. Each groove 62 is deeper than it is wide, with the grooves being formed to be narrow. In the preferred embodiment, each groove 62 has a depth of approximately 3/32" (2.4 mm) and a width of approximately 1/32" (0.8 mm). Grooves 62 should be kept as narrow as possible, so that any drawing of the film into the groove by the vacuum exerted upon the film can be minimized. Otherwise, the optical properties of the film and performance of the overall optical system in the region of the groove could be significantly changed, thereby disturbing the image formed on the film.

It has been found that image quality along the grooves is of particular importance, especially in view of drawing of the film sheet into the grooves. Referring briefly back to FIG. 1, in prior systems for exposing film sheets, it was typical to position focusing lens 37 between mirror 38 and the surface of drum 16. This has the advantage that carriage 39 may be kept relatively small. However, due to the short focal length for such a lens, typically not more than several inches, the cone angle of the light directed at the film is relatively large. Thus, any change in distance to the film surface caused by film being drawn into a groove 62 or hole 64 moves the film along the light cone and can result in a change in the area of the light and its intensity incident upon the film. Narrowing the grooves can reduce this change by reducing the extent to which the film is moved, with the magnitude of the change thus being quite small. However, particularly where the completed film is intended to produce a solid area of grey, black or color on a printed form, noticeable variations corresponding to the grooves can result.

Figure 6:
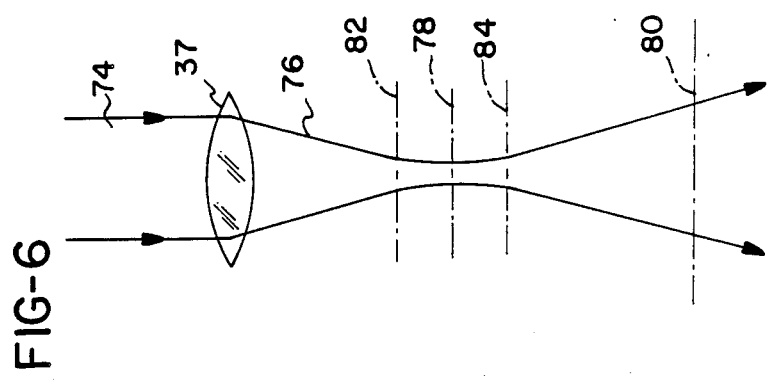
FIG. 6 is a diagram illustrating the effects of drum grooves upon exposure of the film sheet.

This effect can be better understood by referring to FIG. 6. (Dimensional relationships shown in FIG. 6 are greatly exaggerated for clarity, and mirror 38 is omitted.) Beam 74 enters lens 37 and emerges focused into cone 76. As is shown, in a real system, cone 76 is not a true cone and, rather than defining a point, defines an almost columnar portion in the region of the focal plane designated by line 78. Assuming that lens 37 is selected so that line 78 is located at the surface of the film along the drum, portions of the film positioned over grooves can be drawn into the grooves to lower the film surface beneath the level of line 78 with respect to FIG. 6. Thus, for example, if the film were lowered to the position indicated by line 80, the light incident upon the film would be spread over a larger area, reducing the extent to which the film is exposed and affecting the final printed image.

The foregoing assumes a focal length for lens 37 that is sufficiently short that the distance between lines 78 and 80 represents a possible distance that the film can be drawn into the groove. Thus, as noted, one possible solution is to reduce the distance the film can be drawn by reducing the width of the grooves. A second possible solution to this problem is to increase the focal length for lens 37 so that the light cone 76 shown in FIG. 6 is lengthened. In such a case, despite drawing of the film into a groove, the film surface could still be located within the columnar region of the cone located approximately between lines 82 and 84. (The length of this region is also correspondingly increased.) Film exposure along the grooves is thus not noticeably affected.

To impliment this latter solution, lens 37 is moved to the position shown in FIG. 1, which repesents an increase in focal length by a factor of approximately five or six. It has been found that this eliminates any observable trace of the vacuum grooves or holes upon the finished printed forms. To further avoid any problems of this type, lens 37 is further selected so that the surface of the film does not lie exactly at the focal plane shown by line 78. Instead, the light cone 76 is focused behind the film surface, so that the surface is positioned approximately at line 82. Since the film will be drawn only downwardly with respect to FIG. 6, this provides an additional length, between lines 82 and 78, of substantially columnar light through which the film could be moved.

Returning now to FIG. 4, it can be seen that hole 64 is centered on groove 62, but extends beyond groove 62 on each side. In the preferred embodiment, each hole has a diameter of 1/16" (1.6 mm). It has been found to be important that the cross-sectional areas of the grooves and holes be substantially equal. If the grooves were of greater area than the holes, a significant drop in vacuum would take place at the junction between each groove and hole. Consequently, the full vacuum available within the drum could not be used in securing the film to the drum. On the other hand, if the cross-sectional area of the grooves were substantially less than that of the holes, the air velocity within each groove would be increased, thereby increasing losses in vacuum due to friction. In such a case, while the vacuum would not drop at the holes, it would exhibit a drop a short distance along each groove from the holes.

However, some vacuum drop is inherent in the transition from a rectangular flow path to a circular path. In order to maintain the vacuum level of the holes within the grooves, it has been found to be helpful to provide a groove of slightly smaller area than that of the holes. Accordingly, in the preferred embodiment, each groove has a cross-sectional area of 0.0029 in$^2$ (1.9 mm$^2$), while each hole has a cross-sectional area of 0.0031 in$^2$ (2.0 mm$^2$). Thus, substantial equality in this dimension is provided, and the foregoing numerical example has been found to operate successfully.

Referring back to FIG. 3, each groove 62 is provided with a hole 64 at its head end 66. Thus, each groove 62 is supplied with the partial vacuum. Additional holes 64 are located along grooves 62, with their location on the drum surface being determined by standard sizes for precut films to be secured on the drum. Specifically, these standard sizes include 11"×14" (27.9 cm×35.6 cm), 14"×20½" (35.6 cm×52.1 cm) and 20½" by 251/5" (52.1 cm×64.8 cm).

In determining the number of holes to be provided, it is important to note that in almost all instances, portions of the drum surface will be left uncovered. Thus, it is advantageous to provide the drum with only the minimum number of holes required for successful performance, since the presence of extra uncovered holes will require greater quantities of air to be pumped from the interior of the drum.

Further, it will be recognized that the most critical area on the film for securing it in place is along the film edges. If the edges can maintain good contact with the drum, the remainder of the film will stay in place.

Accordingly, the upper edge of a sheet of film is secured to the drum along the row of holes 64a located at the head end of each groove 62. Not only does this enable a number of holes to act directly upon the leading edge of the film, but with the head end of each groove closed, adequate vacuum within the grooves beneath the film is also ensured. Further, the film is located with its left-hand edge (looking at FIG. 3) positioned over the closely spaced pair of grooves 62a, thereby applying additional holding force along this edge of the film.

To ensure proper location of these edges, a plurality of pins 72 are provided at 3½" (8.9 cm) intervals along the drum surface near the head ends 66 of grooves 62. Such pins cooperate with holes provided along the leading edge of a sheet of film, so that by placing the holes over pins 72, proper positioning of the film on the drum surface may be obtained.

It has been found that the optimal location for holes 64 with respect to the trailing edge of the sheet of film is directly beneath the edge of the film, but without any portion of the hole extending beyond the film edge. Consequently, rows of holes are provided across the drum surface in accordance with the standard, common sizes for precut sheets of film. However, since precut films can vary from the stated size on average by approximately one millimeter, the holes are positioned so as to be ⅛" (3.2 mm) from the desired location of the trailing edge.

Accordingly, a row of holes 64b are located along grooves 62 at a distance of 10⅞" (27.6 cm) from the head ends of each of the grooves. These holes are formed in each groove 62 for a distance of 14" (35.6 cm) along the surface of the drum, whereupon the holes are positioned only on alternating grooves as shown by holes 64c. This change in hole frequency results from the fact that precut films of 11"×14" (27.9 cm×35.6 cm) size will not extend the full width of the drum, and therefore holes such holes 64c are not needed to secure a trailing edge of the film. The number of holes is thus reduced to minimize vacuum losses.

Additional rows of holes, such as those shown at 64d located 13⅞" (35.2 cm) from the head ends of the grooves, are provided to accommodate other sizes of film.

In order to obtain satisfactory performance from the vacuum drum, it has been found to be helpful to provide additional holes along some of the grooves at a point intermediate of the leading and trailing edges of the film. In the case of large film sheets, holes provided to secure the trailing edge of smaller sheets such as holes 64b perform this function. However, for small sheets such as 11"×14" (27.9 cm×35.6 cm), extra holes must be provided in the drum surface. Such holes are shown in FIG. 3 as holes 64e. Again, however, to keep the total number of holes at a minimum, holes 64e are provided only along alternate grooves.

In the case of hand cut film of non-standard sizes, it will be seen that holes 64 may not be positioned particularly close to the trailing edge of a sheet of film. In such a case, it may be necessary to manually secure the trailing edge of the film to the drum, such as by small pieces of tape. The vacuum grooves and holes then provide holding force to the sheet, and this has been found to give satisfactory performance. In many cases, however, it is believed that use of non-standard sizes of film will not occur frequently.

The vacuum required to overcome centrifugal force placed upon the film by the rotating drum has been calculated to be approximately 23" H$_2$O (43 mm Hg) at 1800 rpm. It has further been experimentally determined that when a sheet of film is mounted upon the drum disclosed herein, the vacuum actually applied to the film is approximately 73% of the vacuum within the drum interior. Consequently, the theoretical minimum drum vacuum is about 31" H$_2$O (58 mm Hg).

The source of vacuum for the interior of the drum may be any suitable vacuum pump that is capable of producing the necessary vacuum within the drum. As a practical matter, the pump must be capable of producing greater than 31" H$_2$O (58 mm Hg) of vacuum, since allowance must be made for losses within the conduit extending from the pump, the rotary junction joining the conduit with the drum shaft, and along the interior of the drum shaft leading to the drum itself. A preferred pump which has been successfully used is a Spencer Vortex VB-037-E, commercially available from the Spencer Turbine Company, Windsor, Conn. This pump may be used for either 50 Hz or 60 Hz operation, and is rated at 280 c.f.m. (132 liter/sec.) maximum flow and 70" $H_2O$ (131 mm Hg) vacuum at 60 Hz. As noted, relief valve 33 is provided at the pump inlet to protect the pump against overheating from blockage of air paths.

Referring briefly back to FIG. 2, auxiliary passageways 60 connect central passageway 56 with the drum interior near the inner surface of cylindrical body 46. Experiments conducted using a drum without auxiliary passageways 60 yielded satisfactory results in securing a sheet of film so long as the drum was at rest. However, when rotated at 1800 rpm, it was discovered that the vacuum inside the drum dropped by approximately 30%, which could adversely affect drum performance.

Careful measurements taken inside the drum during rotation revealed a high vacuum region (even higher than the vacuum applied by the pump) in the vicinity surrounding the opening of central passageway 56 into the drum interior. At the same time, a very low vacuum was exhibited at the inner drum surface. It is believed that this behavior results from a combination of the turbulence and centrifugal force exerted upon the air molecules caused by rotation of the drum at high speeds. This inhibits the ability of the air to move into central passageway 56 as the drum is rotating.

To solve this problem, auxiliary passageways 60 are provided, connecting the drum interior adjacent the outer egde of the inner face of end block 48 with passageway 56 at a point away from its opening into the drum interior. As shown in FIG. 5, six auxiliary passageways 60 are arranged symmetrically around the drum axis. It is believed that these passageways 60 overcome the problem noted above by enabling air adjacent the inner surface of the drum to be removed from the drum without the air having to make its way into the opening of central passageway 56. It has been found that provision of these passageways results in essentially uniform vacuum throughout the drum interior. While six passageways have been found to perform properly, and are therefore preferred, it will be recognized that other numbers of passageways 60 could be used.

The vacuum drum disclosed herein may be formed from any rigid material, but is preferably constructed from metal, most preferably steel. In making the drum, end blocks 48 and 50 are completely formed, including the machining of passageways 56 and 60 and the threaded holes into which plugs 54 are fitted. Blocks 48 and 50 are then welded onto the ends of cylindrical body 46.

Next, grooves 62 are cut into the surface of body 46, extending completely around the circumference of the drum. As shown in FIG. 5, recess 69 is cut into the drum surface along its entire length. Bar 70 is then fitted and secured into recess 69, thereby defining the head and tail ends for each of the grooves. The holes 64 are drilled into the drum. Finally, the assembled drum is turned to produce a smooth surface over the entire drum.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A rotatable drum for securing thereto a sheet of film by suction provided from a source of partial vacuum, said drum comprising:
   a cylindrical body defining an inner and outer surface and a central axis for said drum;
   first and second circular closure means connected to said cylindrical body for closing said body, each of said closure means defining a circular inner face disposed within said drum and having a center point thereon;
   means connected to said first and second closure means for mounting said drum for rotation;
   said cylindrical body defining on said outer surface thereof a plurality of parallel, identical grooves extending circumferentially about at least a portion of said body, each of said grooves defining a cross-sectional area;
   a plurality of communicating means for connecting the interior of said drum with one of said grooves, each of said communicating means defining an air flow path having a cross-sectional area approximately equal to the cross-sectional area of one of said grooves;
   said first closure means defining therethrough a passage means opening into the drum interior;
   means for connecting said passage means to the source of partial vacuum, whereby said drum may be partially evacuated; and
   at least a portion of said passage means being defined such that said portion opens through said inner face of said first closure means closer to said inner surface of said cylindrical body than to said center point.

2. A drum as defined in claim 1, wherein each of said communicating means includes said body defining therethrough a hole, each of said holes opening on said outer surface into one of said grooves.

3. A drum as defined in claim 1, wherein said passage means includes:
   said first closure means defining concentrically therethrough a central passageway;
   said central passageway being connected to the source of partial vacuum; and
   said first closure means further defining a plurality of auxiliary passageways, each of said auxiliary passageways opening at a first end through said inner face and connecting at a second end with said central passageway, said auxiliary passageways being defined within said first closure means symmetrically about the axis of said drum.

4. A rotatable drum for securing thereto a sheet of film by suction provided from a source of partial vacuum, said drum comprising:
   a cylindrical body defining an inner and an outer surface and a central axis for said drum;
   first and second circular end blocks connected to said cylindrical body for closing said body, each of said end blocks defining an inner face disposed within said drum;
   means connected to said first and second blocks for mounting said drum for rotation;
   said cylindrical body defining on said outer surface thereof a plurality of parallel, identical grooves extending circumferentially about at least a portion of said body, each of said grooves defining a cross-sectional area;

said body further defining a plurality of holes extending therethrough, each of said holes opening on said outer surface into one of said grooves, each of said holes further defining a cross-sectional area approximately equal to the cross-sectional area of one of said grooves;

said first block defining concentrically therethrough a central passageway;

means for connecting said central passageway to the source of partial vacuum, whereby said drum may be partially evacuated; and said first block further defining a plurality of auxiliary passageways, each of said auxiliary passageways opening at a first end through said inner face closer to said inner surface of said cylindrical body than to said central passageway, and connecting at a second end with said central passageway, said auxiliary passageways being within said first block symmetrically about the axis of said drum.

5. A drum as defined in claim 4, wherein said first block defines six of said auxiliary passageways.

6. A drum as defined in claim 4, wherein each of said holes is defined such that the cross-sectional area of said hole is approximately equal to but slightly larger than the cross-sectional area of one of said grooves.

7. A drum as defined in claim 4, wherein said cylindrical body defines on the outer surface thereof means extending across the width thereof parallel to said drum axis and blocking each of said grooves for defining for each of said grooves a head end and a tail end.

8. A drum as defined in claim 4, wherein said cylindrical body defines on the outer surface thereof a strip extending across the width thereof parallel to said drum axis, said grooves being defined such that no grooves extend across said strip, said strip thereby defining for each of said grooves a head end and a tail end.

9. A drum as defined in claim 8, wherein a first one of said holes is defined through said body at said head end of each of said grooves.

10. A drum as defined in claim 8, wherein each of said grooves is separated from an adjacent one of said grooves by substantially ½" (1.27 cm).

11. A drum as defined in claim 8, wherein second ones of said holes are defined through said body along a predetermined number of adjacent ones of said grooves at a distance from said head ends of said grooves approximately equal to a predetermined standard dimension for a sheet of film.

12. A drum as defined in claim 11, wherein third ones of said holes are defined along a portion of said grooves between said first ones and said second ones of said holes.

13. A drum as defined in claim 12, wherein said third ones of said holes are defined in alternating ones of said grooves.

* * * * *